United States Patent

Watanabe et al.

[11] Patent Number: 5,836,860
[45] Date of Patent: Nov. 17, 1998

[54] RESIN ROLL FOR CALENDERING MAGNETIC RECORDING MEDIUM AND MANUFACTURING METHOD THEREFOR

[75] Inventors: Atsuo Watanabe, Hirakata; Kenjiro Nakayama, Yawata; Tatsuyuki Abe, Takatsuki, all of Japan

[73] Assignee: Yamauchi Corporation, Osaka, Japan

[21] Appl. No.: 571,232

[22] Filed: Dec. 12, 1995

[30] Foreign Application Priority Data

Dec. 12, 1994 [JP] Japan ................................. 6-307862

[51] Int. Cl.$^6$ .................................................. B21B 31/08
[52] U.S. Cl. ................................ 492/56; 492/28; 29/724
[58] Field of Search .......................... 492/56, 18, 28, 492/50; 29/724; 428/906

[56] References Cited

U.S. PATENT DOCUMENTS

| | | | |
|---|---|---|---|
| 4,308,311 | 12/1981 | Ogawa et al. | 428/215 |
| 4,324,177 | 4/1982 | Tsuji et al. | |
| 4,466,164 | 8/1984 | Tadokoro et al. | |
| 4,962,578 | 10/1990 | Saito et al. | |
| 5,091,027 | 2/1992 | Watanabe. | |
| 5,419,943 | 5/1995 | Meguro et al. | 428/141 |
| 5,577,443 | 11/1996 | Songer | 492/56 |
| 5,640,662 | 6/1997 | Sugimoto et al. | 492/56 |
| 5,655,444 | 8/1997 | Kayser et al. | 492/56 |
| 5,670,006 | 9/1997 | Wilfong et al. | 156/236 |
| 5,686,172 | 11/1997 | Ohya et al. | 428/210 |

FOREIGN PATENT DOCUMENTS

| | | |
|---|---|---|
| 2405222 | 8/1974 | Germany. |
| 55-135629 | 10/1980 | Japan. |
| 56-004419 | 1/1981 | Japan. |
| 57-024216 | 2/1982 | Japan. |
| 59-011220 | 1/1984 | Japan. |
| 59-54038 | 3/1984 | Japan. |
| 59-124028 | 7/1984 | Japan. |
| 62-12921 | 1/1987 | Japan. |
| 62-042814 | 2/1987 | Japan. |
| 1-199320 | 8/1989 | Japan. |
| 1-246464 | 10/1989 | Japan. |
| 1-260092 | 10/1989 | Japan. |
| 3-50038 | 7/1991 | Japan. |

OTHER PUBLICATIONS

Japanese Industrial Standard JIS B 0601 (1994) Surface roughness Definitions and designation, pp. 1–27.

*Primary Examiner*—Larry I. Schwartz
*Assistant Examiner*—Marc W. Butler
*Attorney, Agent, or Firm*—Birch, Stewart, Kolasch & Birch, LLP

[57] ABSTRACT

In a resin roll 5 for calendering a magnetic recording medium, a surface portion 3a of a thermosetting resin outer layer 3 has high storage elastic modulus (E') of $5 \times 10^{10}$ to $5 \times 10^{11}$ dyn/cm$^2$ at a temperature of 50° to 150° C. at a frequency of 10 hertz (Hz). At the surface portion of the thermosetting resin outer layer, the expression representing the relation between storage elastic modulus (E') and the Poisson's ratio (v) is within the following range, under the same conditions:

$$2 \times 10^{-12} \text{ cm}^2/\text{dyn} < (1-v^2)/E' < 2 \times 10^{-11} \text{ cm}^2/\text{dyn}$$

14 Claims, 5 Drawing Sheets

RESIN ROLL FOR CALENDERING MAGNETIC RECORDING MEDIUM AND MANUFACTURING METHOD THEREFOR

BACKGROUND OF THE INVENTION

1. Field of the Invention

The present invention relates to a resin roll for calendering a magnetic recording medium and to a manufacturing method thereof.

2. Description of the Background Art

Generally, it is a wide spread practice in the manufacturing of a magnetic recording medium to apply a magnetic layer on a base film and to perform calendering thereafter.

Generally, in the process of manufacturing a magnetic recording medium, the magnetic recording medium is calendered by being passed between a mirror-surfaced metal roll and an elastic roll such as a resin roll disposed in opposing relationship thereto. A high nip pressure is applied to the recording medium to eliminate voids in magnetic layer, to make the surface of the magnetic recording medium smooth and to increase the density of the magnetic layer. In this case, the magnetic layer side of the magnetic recording medium is brought into contact with the metal roll.

The signal density of the magnetic recording medium has been significantly improved recently. In order to obtain a highly dense magnetic recording medium, it is necessary to apply a magnetic coating filled with magnetic powder to a high density on the base film so as to increase the magnetic flux density. However, if the amount of the magnetic powder is increased, it becomes difficult to eliminate voids in the magnetic layer generated when the solvent is dried, and also it has been difficult to obtain sufficient surface smoothness of the magnetic layer under the conventional conditions for calendering, because hardness of the magnetic coating could have been increased.

Accordingly, in order to make smooth the surface of the above described magnetic layer filled with magnetic powder to a high density and to completely eliminate voids, it is necessary to apply higher temperature and higher nip pressure in the calendering step.

Accordingly, there has been a demand for a resin roll for calendering which can be used at higher temperature and which can provide greater pressure.

The following characteristics are required of the resin roll for calendering.

(1) A roll with satisfactory high surface smoothness.
(2) Hardness, especially high surface hardness.
(3) Heat resistance, especially heat resistance to render the roll less likely to deform due to thermal expansion or melting that would result from autogenous heat.
(4) Compression strength to withstand the high nip pressure applied by the metal roll and to remain free of cracking or breaking.
(5) A roll free of pin holes.

However, in the conventional resin roll for calendering a magnetic recording medium, the roll properties are limited, so that the nip width, that is, the nip area tends to be unavoidably large. Therefore, in terms of applied pressure, that is, pressure per unit area acting on the nip surface, satisfactory pressure per unit area to meet the recent demand for high density magnetic recording medium could not be obtained. Furthermore, in order to improve efficiency in processing, when heating is performed at a higher temperature or when the press load is increased to obtain larger pressure per unit area, the nip width, that is, the nip area is further enlarged, making it difficult to obtain the effective pressure per unit area at the nip surface.

SUMMARY OF THE INVENTION

An object of the present invention is to provide a resin roll for calendering a magnetic recording medium in which the nip width is smaller than that of the prior art under a similar load, and the nip width is not increased, even when under high load at a high temperature, thus providing substantially larger pressure per unit area, whereby the surface is smooth and surface hardness is high, which provides compression strength and heat resistance and is free of pin holes.

Another object of the present invention is to provide a method of manufacturing the above described high performance resin roll for calendering a magnetic recording medium at low cost with high efficiency.

Still another object of the present invention is to provide a calendering apparatus employing the above described high performance resin roll as an elastic roll.

The above described objects of the present invention are attained by a resin roll for calendering a magnetic recording medium including a metal roll core and a thermosetting resin outer layer, wherein a surface portion of the thermosetting resin outer layer has a storage elastic modulus (E') from $5 \times 10^{10}$ to $5 \times 10^{11}$ dyn/cm$^2$ at a temperature in the range from 50° to 150° C. at a frequency of 10 hertz (Hz). More specifically, according to the present invention, the storage elastic modulus (E') of the surface portion of the thermosetting resin outer layer of the resin roll for calendering at a temperature of use is increased, whereby the nip width can be made smaller, and since the high storage elastic modulus (E') of the surface portion is maintained even at a high temperature, a small nip width can be maintained.

Preferably, the storage elastic modulus (E') at the surface portion of the thermosetting resin outer layer of the roll should be at least $6 \times 10^{10}$ dyn/cm$^2$, and more preferably, it should be at least $8 \times 10^{10}$ dyn/cm$^2$. Preferably, it should be at most $2 \times 10^{11}$ dyn/cm$^2$, and more preferably, it should be at most $1.5 \times 10^{11}$ dyn/cm$^2$.

The conditions for measurement for temperature and frequency described above are set as close as possible to the conditions for use of the resin roll for calendering. The temperature is normally in the range from 50° to 150° C., which is preferably 50° to 180° C. and, more preferably, 50° to 200° C.

The frequency is set to 10 hertz. This value is selected for the following reasons. If the outer periphery of the resin roll for calendering is set to 1 m and the running speed to 300 m/min, for example, the rate rotation of the roll is 300 rpm, and the frequency corresponding to this rate of rotation is 5 Hz. However, if the resin roll for calendering is pinched between two metal rolls, the surface portion of the roll passes twice the nip per one rotation, and hence the frequency is set to 10 Hz.

In the foregoing, if the storage elastic modulus (E') at the surface portion of the thermosetting resin outer layer of the resin roll for calendering is not higher than $5 \times 10^{10}$ dyn/cm$^2$, the nip width becomes too large, resulting in similar pressure per unit area as that of the prior art, and hence it is not preferable. If the storage elastic modulus (E') exceeds $5 \times 10^{11}$ dyn/cm$^2$, the nip width becomes smaller and larger pressure per unit area can be obtained. However, since the storage elastic modulus (E') is too large, ups and downs of the material to be processed cannot be absorbed by the roll surface, hindering uniform calendering. Therefore, it is not preferable.

The thermosetting resin constituting the outer layer of the resin roll for calendering includes, for example, epoxy resin, polyurethane resin, polyisocyanurate resin, cross linked polyesteramide resin, unsaturated polyester resin and diallylphthalate resin. In view of durability, heat resistance and moldability, epoxy resin and cross linked polyesteramide resin are preferable, and specifically, epoxy resin is desired.

The aforementioned metal roll core is made of a metal such as iron, steel, stainless steel or aluminum.

From another view point, the resin roll for calendering a magnetic recording medium in accordance with the present invention includes a metal roll core and a thermosetting resin outer layer, wherein an expression $(1-v^2)/E'$ representing relation between storage elastic modulus ($E'$) and the Poisson's ratio ($v$) with respect to Hertz's equation representing nip width of the surface portion of the thermosetting outer layer is within the range of $$5 \times 10^{-12} \text{ cm}^2/\text{dyn} < (1-v^2)/E' < 2 \times 10{-11} \text{ cm}^2/\text{dyn}$$

under the condition that the temperature is 50° to 150° C. and the frequency is 10 Hz.

In the above expression, $E'$ represents storage elastic modulus of the surface portion of the thermosetting resin outer layer of the resin roll, and $v$ represents the Poisson's ratio of the surface portion.

Here, generally, it is known that the nip width when two rolls are in contact with and parallel to each other and subjected to a load ($P$) per unit length in axial direction can be represented by the Hertz's equation below.

Hertz's Equation $$\text{NipWidth}(N) = 4\sqrt{K_1 + K_2} \cdot \sqrt{\frac{R_1 \cdot R_2}{R_1 + R_2}} \cdot \sqrt{P}$$

$$K_1 = \frac{1 - v_1^2}{\pi E_1},$$

$$K_2 = \frac{1 - v_2^2}{\pi E_2}$$

where

N: nip width
$R_1$: radius of first roll
$R_2$: radius of second roll
P: load power unit length
$v_1$: Poisson's ratio of the first roll
$v_2$: Poisson's ratio of the second roll
$E_1$: elastic modulus of the first roll
$E_2$: elastic modulus of the second roll
$\pi$: the ratio of the circumference of a circle to its diameter.

In the foregoing, if the first roll is the resin roll for calendering and the second roll is a metal roll, for example, it is understood that the nip width (N) is in proportion to the square root of ($K_1+K_2$) provided that the radii ($R_1$, $R_2$) of both rolls and the load (P) are constant.

When the relation between the resin roll and the nip width is considered, the nip width (N) is influenced by the value of $(1-v_1^2)/E_1$.

In other words, the smaller the value $(1-v_1^2)/E_1$ of the surface of the resin roll, the smaller the nip width (N).

The foregoing is a theory assuming a static condition. When the roll in actual use is considered, the elastic modulus ($E_1$) must be considered as a dynamic elastic modulus, that is, storage elastic modulus.

Conventionally, the importance of the relation between temperature and storage elastic modulus ($E'$) of the resin roll for calendering have been recognized. However, the Poisson's ratio ($v$) has not been considered. Based on the theory described above, the inventors recognized that the relation between each of temperature, storage elastic modulus ($E'$) and Poisson's ratio ($v$) is important, and through extensive study, they have found that the resin roll providing desirable nip width as a resin roll for calendering a magnetic recording medium has the value within the following range:

$$2 \times 10^{-12} \text{ cm}^2/\text{dyn} < (1-v^2)/E' < 2 \times 10^{-11} \text{ cm}^2/\text{dyn}.$$

Here, if the value of the expression $(1-v^2)/E'$ representing the relation between storage elastic modulus ($E'$) and Poisson's ratio ($v$) of the resin roll for calendering a magnetic recording medium is lower than $2 \times 10^{-12}$ cm²/dyn, ups and downs of the material to be processed cannot be absorbed by the roll surface, hindering uniform calendering. Therefore, it is not preferable.

Further, if the value of the expression $(1-v^2)/E'$ exceeds $2 \times 10^{-11}$ cm²/dyn, the nip width becomes too large, and only the pressure per unit area similar to that of the prior art can be obtained. Therefore, it is not preferable.

Preferably, the value of the expression $(1-v^2)/E'$ should be at least $5 \times 10^{-12}$ cm²/dyn, and more preferably, it should be at least $6 \times 10^{-12}$ cm²/dyn. Preferably, it should be at most $1.8 \times 10^{-11}$ cm²/dyn and, more preferably, it should be at most $1.5 \times 10^{-11}$ cm²/dyn.

The measuring condition of temperature is set to be 50° to 150° C. as described above. Preferably, the temperature should be from 50° to 180° C., and more preferably from 50° to 200° C.

The frequency is set to 10 Hz from the same reason as described above.

According to the present invention, as the value of the expression $(1-v^2)/E'$ representing the relation between storage elastic modulus ($E'$) and Poisson's ratio ($v$) at the surface portion of the thermosetting resin outer layer of the resin roll is small, the nip width can be made smaller, and as the value of the expression $(1-v^2)/E'$ is maintained at a small value even at a high temperature, small nip width can be maintained.

The thickness of the thermosetting resin outer layer is, appropriately, from 5 to 50 mm.

In the resin roll for calendering a magnetic recording medium in accordance with the present invention, normally, the thermosetting resin outer layer is filled with inorganic powder, and the surface portion of the thermosetting resin outer layer is uniformly filled with a high percentage content of the inorganic powder. The percentage content of the inorganic powder at the surface portion of the resin outer layer is from 60 to 95 percent by weight.

Here, the inorganic powder includes carbon black, quartz powder, silica powder, silicon oxide, silicon carbide, glass powder, alumina, titanium oxide, potassium titanate, aluminum hydroxide, calcium carbonate, magnesium carbonate, talc, clay, glass beads, bentonite, iron powder, copper powder, aluminum powder and ferrite powder.

The average particle diameter of the inorganic powder is from 0.05 to 50.0 μm.

Since the surface portion of the thermosetting resin outer layer of the resin roll is uniformly filled with a high percentage content of inorganic powder, the elastic roll has high strength, high hardness, and high storage modulus, and hence the nip width can be made smaller.

If the content of inorganic powder at the surface portion of the thermosetting resin outer layer of the resin roll is smaller than 60 percent by weight, necessary strength, hardness, or elastic modulus cannot be obtained. If the content of the inorganic powder exceeds 95 percent by weight, viscosity of a slurry-like mixture of thermosetting resin material and inorganic powder becomes too high, making it difficult to cast the thermosetting resin outer layer of the roll, and also making it difficult to remove air during casting. As a result, pin holes may be generated in the thermosetting resin outer layer. Therefore, it is not preferable.

Preferably, the lower limit of the content of the inorganic powder is at least 65 percent by weight, and more preferably, it should be at least 70 percent by weight. The upper limit should preferably be at most 85 percent by weight, and more preferably, 80 percent by weight.

If the average particle diameter of the inorganic powder is smaller than 0.05 $\mu$m, the viscosity of the slurry-like mixture of thermosetting resin raw material and inorganic powder becomes too high, making it difficult to cast the thermosetting resin outer layer of the roll, and also making it difficult to remove air during casting. As a result, pin holes may be generated in the thermosetting resin outer layer. Therefore, it is not preferable. Further, if the average particle diameter of the inorganic powder exceeds 50.0 $\mu$m, smoothness of the roll surface is degraded, and hence it is not preferable.

Preferably, the lower limit of average particle diameter of the inorganic powder should be at least 0.1 $\mu$m and more preferably, at least 0.3 $\mu$m. The upper limit should preferably be at most 30 $\mu$m and, more preferably at most 10 $\mu$m.

The thickness of the surface portion of the thermosetting resin outer layer filled with high a percentage content of inorganic powder should preferably be at least 0.5 mm, and more preferably, at least 1.0 mm.

If the thickness of a surface portion filled with a high content of inorganic powder of the thermosetting resin outer layer is smaller than 0.5 mm, the nip portion may be influenced by the inner thermosetting resin layer which has lower hardness, and hence it is not preferable. Though there is no specific upper limit in the thickness of the surface portion filled with a high content of inorganic powder of the outer layer, a maximum thickness of 20 mm may be appropriate.

Furthermore, in the resin roll for calendering a magnetic recording medium in accordance with the present invention, the hardness of the surface portion of the thermosetting resin outer layer is no smaller than 95° and no smaller than 100° in terms of shore D hardness.

If the hardness of the surface portion of the thermosetting resin outer layer is smaller than 95° in terms of shore D hardness, the nip width becomes too large to provide satisfactory pressure per unit area. The hardness should preferably be at least 96°. Strictly speaking, it is not possible to have the hardness of 100°. However, the hardness should desirably be as close to 100° as possible.

In the resin roll for calendering a magnetic recording medium in accordance with the present invention, generally, surface roughness (Ra) at the surface portion of the thermosetting resin outer layer is in the range of not more than 0.5 $\mu$m, preferably not more than 0.2 $\mu$m and desirably, not more than 0.1 $\mu$m. Here, the surface roughness (Ra) means the arithmetical mean roughness (Ra) defined by JIS (Japanese Industrial Standard) B0601. The surface portion of the thermosetting resin outer layer should be as smooth as possible. However, in practice, it is difficult to make the surface roughness (Ra) at the surface portion of the resin outer layer to be smaller than 0.01 $\mu$m. If the surface roughness (Ra) at the surface portion of the thermosetting resin outer layer exceeds 0.5 $\mu$m, the smoothness of the roll surface is degraded, making it impossible to make the surface of the magnetic recording medium smooth. Therefore, it is not preferable.

The resin roll for calendering a magnetic recording medium in accordance with the present invention is further provided with a fiber-reinforced lower winding layer formed of a fiber material impregnated with a thermosetting resin on an outer peripheral surface of the metal roll core. The fiber-reinforced lower winding layer is formed by a fiber material impregnated with a thermosetting resin around the metal roll core.

The fiber material to be used may be made of an inorganic fiber or an organic fiber. It is desirable to use an inorganic fiber such as glass fiber, carbon fiber or metal fiber, which is hard, has high level of elastic recovery, exhibits good adhesion to resins and exhibits a high fastening force. Also usable are organic fibers such as polyamide fiber, aromatic polyamide fiber, polyimide fiber, polyester fiber, phenolic fiber or acrylic fiber.

The fiber material is in the form of a yarn, roving, cloth tape or the like. In view of the strength of the roll obtained, it is desirable to use the cloth tape or the roving and cloth tape in combination.

Examples of the thermosetting resins for impregnating the fiber material are epoxy resin, unsaturated polyester resin, diallylphthalate resin, polyurethane resin and the like. Such thermosetting resins include both thermosetting-type resin and cold setting-type resin.

A filler in the form of inorganic powder such as quartz, glass beads, hydrated alumina, clay powder, silica powder or calcium carbonate may be mixed with the thermosetting resin. The average particle diameter of the inorganic powder should be from 1 to 200 $\mu$m, and preferably from 5 to 100 $\mu$m. Powder having an average particle diameter of smaller than 1 $\mu$m is not readily available, leading to higher cost. Therefore, it is not preferred. Furthermore, if it exceeds 200 $\mu$m, uniform dispersion in the resin becomes difficult.

A non-woven fabric is also usable for the lower winding layer. For example, on an outer peripheral surface portion of the aforementioned cloth tape or of the roving and cloth tape impregnated with filler-contained thermosetting resin, a layer of a non-woven fabric which is similarly impregnated with filler-mixed thermosetting resin may be wound around to be fitted over and joined together, to serve as the lower winding layer.

Such a non-woven fabric has the excellent function of holding the inorganic material as uniformly incorporated therein in its entirety. The non-woven fabric to be used is made of an organic fiber such as acrylic fiber, polyester fiber or phenolic fiber, or an inorganic fiber such as glass fiber or metal fiber. Preferably, the non-woven fabric is in the form of a tape.

The lower winding layer is 1 to 50 mm in overall thickness. If less than 1 mm in thickness, the layer is insufficient in strength, exerts a smaller fastening force on the roll core, and therefore it is not suitable to use. On the other hand, if the thickness exceeds 50 mm, the layer will not have a correspondingly increased strength but becomes more costly, and therefore it is undesirable. In view of the strength of the roll, the fastening force of the roll core and the like, the thickness of the lower winding layer is preferably in the range of 2 to 15 mm.

Accordingly, the lower winding layer formed on the outer peripheral surface of the roll core is positioned between the roll core and the thermosetting resin outer layer, improving fitting and joining of the two. Furthermore, the lower winding layer prevents separation from the roll core as it reinforces the fastening force of the roll core.

The above described objects of the present invention can be attained by a method of manufacturing a resin roll for calendering a magnetic recording medium in which a slurry-like mixture of thermosetting resin raw material and an inorganic powder having an average particle diameter of from 0.05 to 50.0 μm is cast to a cylindrical mold for rotational casting, an outer layer hollow cylinder of a thermosetting resin containing at its surface portion a inorganic powder at the content of 60 to 95 percent by weight is formed by rotational casting a metal roll core is fitted in the outer layer hollow cylinder, and the roll core and the outer layer hollow cylinder a refitted and joined together.

Preferably, an adhesive is injected into an annular clearance between the metal roll core and the outer layer hollow cylinder and the adhesive is cured so that the roll core and the outer layer hollow cylinder are bonded together by the adhesive layer.

Preferably, the method of manufacturing a resin roll for calendering a magnetic recording medium in accordance with the present invention includes the step of forming a fiber-reinforced lower winding layer formed of the aforementioned fiber material impregnated with the thermosetting resin on an outer peripheral surface of the metal roll core. The method of manufacturing the resin roll for calendering a magnetic recording medium in accordance with the present invention will be described with reference to the figures.

First, as shown in FIG. 1, a fiber material impregnated with the thermosetting resin is wound to a prescribed thickness on an outer peripheral surface of a metal roll core (1), thus forming a fiber-reinforced lower winding layer (2). The metal roll core (1) is formed of a metal such as stainless steel, and it is desirable to make the outer periphery thereof have a rough-surface by sandblasting or by forming a multiplicity of helical grooves, since the rough-surface promotes tight joining of the roll core (1) and the lower winding layer (2).

In addition, an outer layer hollow cylinder (3) of a thermosetting resin shown in FIG. 2 is prepared. This is formed by casting a slurry-like mixture of the thermosetting resin raw material and an inorganic powder having an average particle diameter of 0.05 to 50.0 μm into a cylindrical mold for rotational casting, performing rotational casting so that the surface portion (3a) comes to contain the inorganic powder at a prescribed content, and curing the thermosetting resin at a prescribed temperature. Thus, the outer layer hollow cylinder (3) of the thermosetting resin is formed.

The curing temperature of the thermosetting resin is determined dependent on the type of the resin used. If the resin is a thermo-setting type, the curing temperature is generally from 100° to 300° C., and if the resin is a cold-setting type, reaction and curing takes place at room temperature.

In this manner, by rotational casting, the thermosetting resin outer layer (3) containing at its surface portion (3a) the inorganic powder at a prescribed ratio having superior surface smoothness, high surface hardness, superior compression strength and heat resistance and being free of pin holes can be obtained. Thereafter, as shown in FIG. 3, the thermosetting resin outer layer (3) is fitted around the metal roll core (1) having the fiber-reinforced lower winding layer (2), an adhesive is injected into an annular clearance formed between the lower winding layer (2) and the outer layer hollow cylinder (3), the adhesive is cured at a prescribed temperature, fiber-reinforced lower winding layer (2) and the outer layer hollow cylinder (3) are fitted and bonded together by the adhesive layer (4), and thus the resin roll (5) for calendering a magnetic recording medium in accordance with the present invention is manufactured.

Examples of usable adhesives are epoxy resins, unsaturated polyester resins, diallylphthalate resin or the like, depending on the necessary heat resistance, pressure resistance, etc.

The adhesive is cured at a temperature usually of 20° to 150° C. It is especially desirable to set the curing temperature of the adhesive to be approximately the same as the surface temperature of the resin roll (5) for calendering a magnetic recording medium during use. The reason for this is that this eliminates the residual stress of the thermosetting resin outer layer (3) when the resin roll (5) is in use, rendering the thermosetting resin outer layer (3) more resistant to breaking even when subjected to high pressure.

In the resin roll for calendering a magnetic recording medium in accordance with the present invention described above, the surface portion of the thermosetting resin outer layer has a high storage elastic modulus (E') from $5\times10^{10}$ to $5\times10^{11}$ dyn/cm² at a temperature from 50° to 150° C. with the frequency of 10 hertz (Hz), and the value of the expression $(1-v^2)/E'$ representing the relation between the storage elastic modulus (E') and Poisson's ratio (v) has a value as low as $$2\times10^{-12} \text{ cm}^2/\text{dyn} < (1-v^2)/E' < 2\times10^{-11} \text{ cm}^2/\text{dyn}$$

so that the nip width of the resin roll for calendering can be made smaller, and the nip width can be smaller than the prior art example when subjected to the same load. In other words, a substantially larger pressure per unit area can be obtained. Therefore, according to the resin roll of the present invention, it is possible to make the surface of the magnetic recording medium smooth and to surely perform processing such as increasing the density of the magnetic layer, by passing a recording medium through the rolls while applying high nip pressure.

According to the method of manufacturing a resin roll for calendering a magnetic recording medium in accordance with the present invention, a mixture of a thermosetting resin raw material and an inorganic powder is molded by rotational casting, so that an outer layer hollow cylinder of the thermosetting resin containing, at its surface portion, inorganic powder at a high percentage content is obtained. Therefore, the resin roll for calendering a magnetic recording medium can be manufactured at low cost with high efficiency, and the obtained resin roll for calendering has a smooth surface, high surface hardness, superior compression strength and heat resistance and is free of pin holes. Therefore, the resin roll thus obtained is suitable for manufacturing the magnetic recording medium.

The calendering apparatus for the magnetic recording medium in accordance with the present invention performs surface processing of the magnetic recording medium by nip pressure between a metal roll and an elastic roll, and as the elastic roll, the above described high performance resin roll is used. According to one aspect, the elastic roll includes a metal roll core and a thermosetting resin outer layer, and the surface portion of the thermosetting resin outer layer has a storage elastic modulus (E') of $5\times10^{10}$ to $5\times10^{11}$ dyn/cm² at the temperature of from 50° to 150° C. at the frequency of 10 Hz. According to another aspect, the elastic roll includes a metal roll core and a thermosetting resin outer layer, and at the surface portion of the thermosetting resin outer layer, the expression $(1-v^2)/E'$ representing the relation between storage elastic modulus (E') and Poisson's ratio (v) related to Hertz's equation representing the nip width is within the range of $2\times10^{-12}$ cm$^2$/dyn$<(1-v^2)/E'<2\times10^{-11}$ cm$^2$/dyn at a temperature of 50° to 150° C. at the frequency of 10 Hz.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described, with reference to examples for comparison.

[INVENTIVE EXAMPLE 1]

Figure 3:
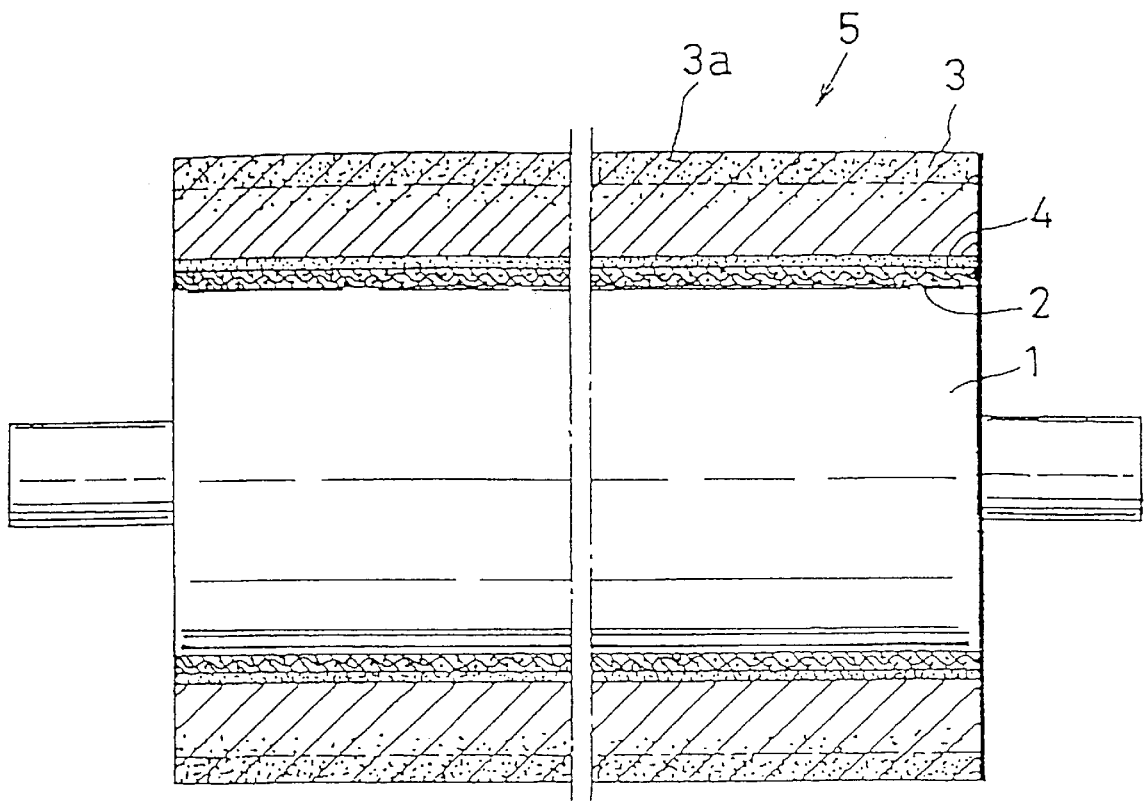
FIG. 3 is a partially omitted cross sectional view of a resin roll for calendering a magnetic recording medium in accordance with the present invention.

The resin roll (5) for calendering a magnetic recording medium in accordance with the present invention shown in FIG. 3 was prepared by the following method.

Figure 1:
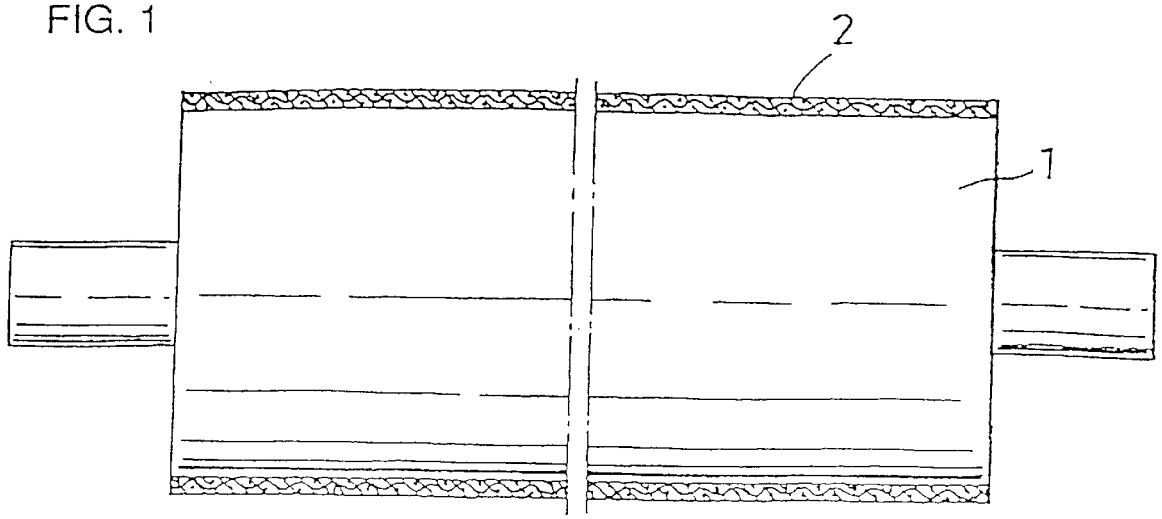
FIG. 1 is a partially omitted cross sectional view of a roll core with a lower winding layer.

First, as shown in FIG. 1, an iron roll core (1) having a length of 1200 mm, surface length of 650 mm and outer diameter of 300 mm was rough-surfaced over the outer periphery by sandblasting, and a fiber material impregnated with epoxy resin was wound around the outer periphery of the roll core (1) to form a fiber-reinforced lower winding layer (2) having a thickness of 4 mm. The fiber-reinforced lower winding layer (2) was formed by winding a glass cloth tape impregnated with epoxy resin mixed with silica powder on a peripheral surface of roll core (1), and thereafter winding a glass roving impregnated with a similar epoxy resin on the outer periphery of the tape layer. The epoxy resin was cured at 110° C.

Figure 2:
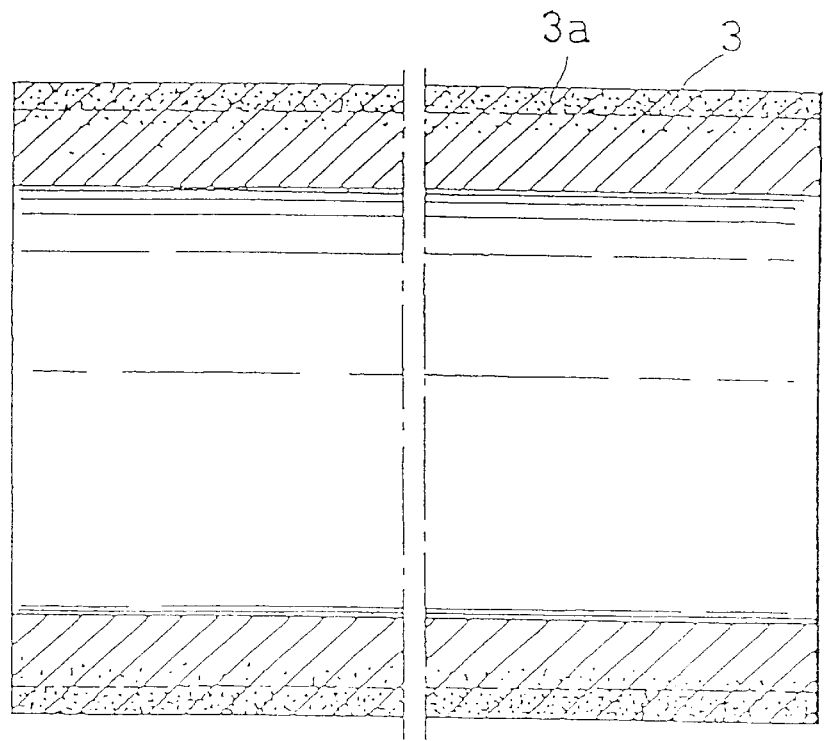
FIG. 2 is a partially omitted cross sectional view of a thermosetting resin outer layer.

Then, separate from the above, a mixture including epoxy resin raw material containing 100 parts by weight of resin and 52 parts by weight of a hardener mixed with 120 parts by weight of silica powder having an average particle diameter of 0.5 μm was cast to a cylindrical mold for rotational casting (not shown), rotational casting was performed at a mold temperature of 80° C. and a rate of rotation of 1500 rpm, and thus outer layer hollow cylinder (3) of epoxy resin containing at its surface portion (3a) a prescribed high percentage content of silica powder was prepared. The hollow cylinder (3) taken out from the mold was subjected to post curing at a temperature of 90° to 180° C., outer peripheral surface and inner peripheral surface of the outer layer hollow cylinder (3) of epoxy resin were cut, and thus the outer layer hollow cylinder (3) of epoxy resin shown in FIG. 2 having an outer diameter of 340 mm, an inner diameter of 309 mm, and length of 400 mm was prepared.

The outer layer hollow cylinder (3) of epoxy resin was fitted around the roll core (1) having the lower winding layer (2), an adhesive mainly consisting of epoxy resin was injected into an annular clearance formed between the lower winding layer (2) and the outer layer hollow cylinder (3), the adhesive was cured at a temperature of 80° C., the lower winding layer (2) and the outer layer hollow cylinder (3) of epoxy resin were bonded together by an adhesive layer (4) having a thickness of 0.5 mm, the outer peripheral surface of the roll was cut and polished, whereby the resin roll (5) for calendering a magnetic recording medium shown in FIG. 3 was manufactured. The resin roll (5) had an outer diameter of 335 mm and a surface length of 400 mm.

[INVENTIVE EXAMPLE 2]

The resin roll (5) for calendering a magnetic recording medium in accordance with the present invention was manufactured in a similar manner as Inventive Example 1 described above.

First, as in Inventive Example 1, a fiber material impregnated with epoxy resin was wound around the outer peripheral surface of iron roll core (1) to form a fiber-reinforced lower winding layer (2) having a thickness of 4 mm.

Then, separate from the above, a mixture including 100 parts by weight of resin composition of 2.1 mole of bis(2-oxazoline) compound and 1.0 mole of dicarboxylic acid mixed with 1.6 parts by weight of phosphite and further mixed with 94.1 parts by weight of silica powder having an average particle diameter of 10 μm was cast to a cylindrical mold (not shown) for rotational casting in a similar manner as in Inventive Example 1 described above. Rotational casting was performed at a mold temperature of 130° C. and a rate rotation of 800 rpm, thus an outer layer hollow cylinder (3) of cross linked polyesteramide resin containing at its surface portion (3a) a prescribed high percentage content of silica powder was prepared. The hollow cylinder (3) taken out from the mold was subjected to post curing at a temperature of 160° C., the outer peripheral surface and the inner peripheral surface of the outer layer hollow cylinder (3) were cut, and thus the outer layer hollow cylinder (3) shown in FIG. 2 having an outer diameter of 340 mm, inner diameter of 309 mm and length of 400 mm was prepared.

The outer layer hollow cylinder (3) of cross linked polyesteramide resin was fitted over the roll core (1) having a lower winding layer (2), an adhesive mainly consisting of epoxy resin was injected into an annular clearance formed between the lower winding layer (2) and the outer layer hollow cylinder (3), the adhesive was cured at a temperature of 80° C., the lower winding layer (2) and the outer layer hollow cylinder (3) of cross linked polyesteramide resin were bonded together by the adhesive layer (4) having a thickness of 0.5 mm, the outer peripheral surface of the roll was cut and polished, whereby the resin roll (5) for calendering a magnetic recording medium shown in FIG. 3 was prepared. The resin roll (5) an outer diameter of 335 mm and a surface length of 400 mm.

Performance Evaluation Test

In order to evaluate the performance of the resin rolls (5) for calendering a magnetic recording medium in accordance with Inventive Examples 1 and 2 above, small sized rolls for performance evaluation were manufactured using the same material and substantially the same conditions for respective rolls. The iron roll core (1) had an outer diameter of 192 mm, surface length of 290 mm and an length of 760 mm, and the manufactured small resin roll (5) had the outer diameter of 230 mm and effective surface length of 230 mm.

[COMPARATIVE EXAMPLE 1]

For comparison, a small sized roll having the same size as above was manufactured by using the same material and in the same manner as Inventive Example 2 above except that silica powder was not introduced.

[COMPARATIVE EXAMPLE 2]

An iron roll core and a fiber reinforced lower winding layer similar to those of Inventive Example 1 were prepared, the roll core having a lower winding layer was set vertically in a mold for casting having a prescribed size, a mixture including an epoxy resin raw material consisting of 100 parts by weight of resin and 52 parts by weight of a hardener mixed with 79 parts by weight of silica powder having average particle diameter of 10.0 μm was directly injected on the outer side of the iron roll core and cured, the roll outer periphery was cut and polished, thus a small sized roll for a comparison test having the same size as described above was manufactured.

[COMPARATIVE EXAMPLE 3]

An iron roll core and a fiber-reinforced lower winding layer similar to those of Inventive Example 1 were prepared. The roll core with a lower winding layer was set vertically in a mold for casting having a prescribed size, a mixture including an epoxy resin raw material consisting of 100 parts by weight of resin and 65 parts by weight of a hardener mixed with 50 parts by weight of silica powder having an average particle diameter of 10.0 μm was directly cast to the outside of the iron roll core in the mold and cured, the roll outer periphery was cut and polished, and thus a small sized roll for a comparison test having the same size as described above was manufactured.

The relation between temperature and storage elastic modulus (E') of the surface portion of the thermosetting resin outer layer of each of the small sized test rolls in accordance with Inventive Examples 1 and 2 and the Comparative Examples 1 to 3 at the frequency of 10 Hz was measured by a viscoelastic spectrometer (manufactured by IWAMOTO SEISAKUSHO CO., LTD). The results obtained are shown in Tables 1 and 2 and the graph of FIG. 4.

Poisson's ratio (ν) at the surface portion of each roll was measured in accordance with JIS K7054, and based on the measured values and the measured results of the aforementioned storage elastic modulus (E'), the value of the expression $(1-\nu^2)/E'$ representing the relation between storage elastic modulus (E') and Poisson's ratio (ν) related to Hertz's equation representing the nip width at each temperature was calculated. The obtained results are as shown in Tables 1 and 2 and the graph of FIG. 5.

Thereafter, the content of silica powder at the surface portion of the epoxy resin outer layer or the cross linked polyesteramide resin outer layer of the small sized test rolls were measured. The measurement of the content of silica powder was performed by taking a sample piece having the thickness of 1 mm from the surface portion of the resin outer layer of each of the small sized test rolls, and ash content measurement of each sample piece was performed. A thermo gravimetry/differential thermal analyzer (manufactured by Seiko Instruments Inc.) was used for measurement. The obtained results are as shown in Table 1.

The hardness at the surface portion of the resin outer layer of each of the small sized test rolls was measured by a shore durometer (D type), and the surface roughness (Ra) at the surface portion of the resin outer layer was measured by using the surface texture measuring apparatus (manufactured by Tokyo Seimitsu). The obtained results are also shown in Table 1.

Further, nip widths of the small sized test rolls in accordance with Inventive Examples 1 and 2 and Comparative Examples 1 to 3 for performance evaluation test were measured.

Figure 6:
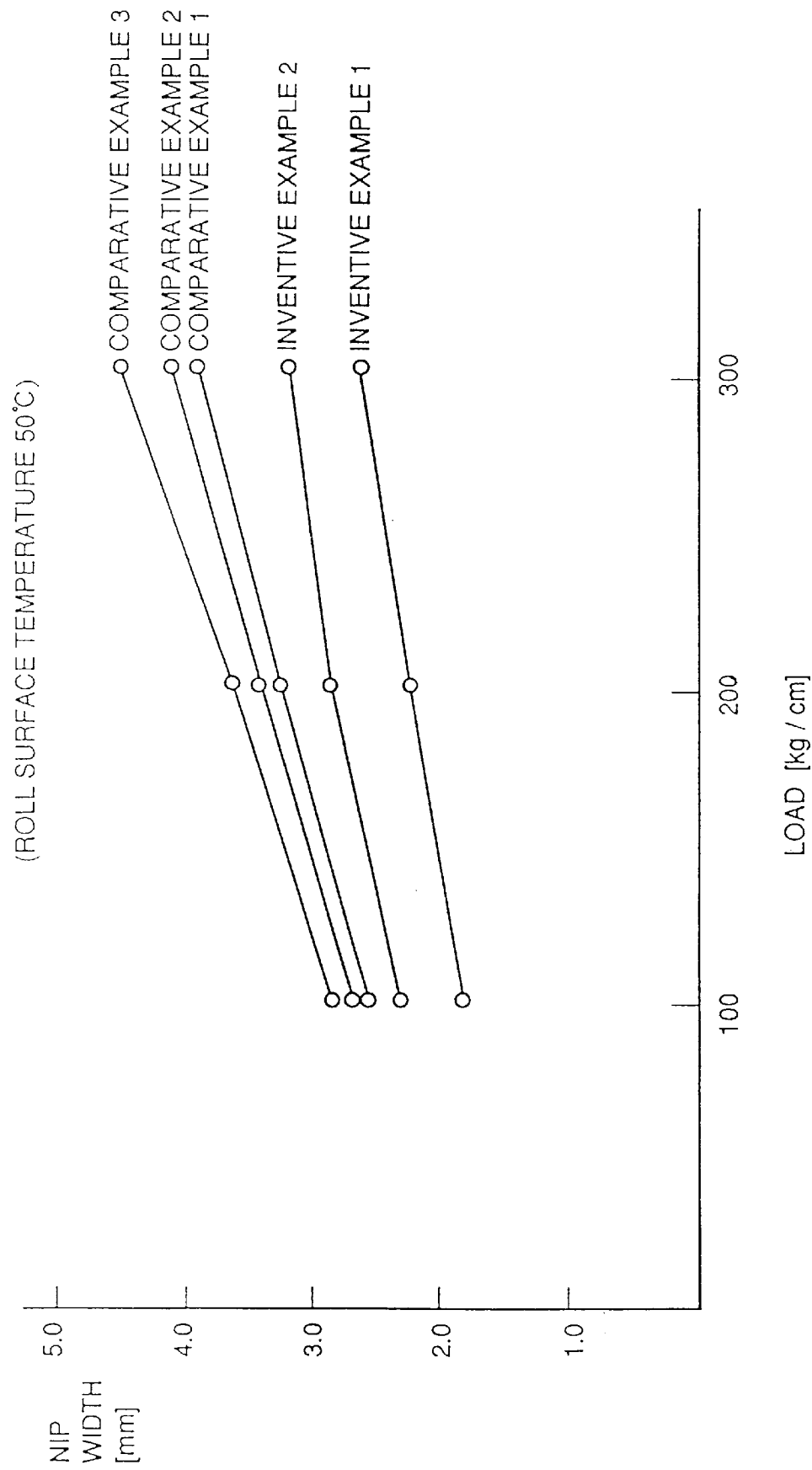
FIG. 6 is a graph showing relation between the nip width and load of small size test rolls in accordance with embodiments of the present invention and examples for comparison.

The measurement of the nip widths was performed in the following manner. A steel roll having an outer diameter of 202 mm and effective surface length of 230 mm was brought into contact with each roll, and aluminum foil (not shown) 15 μm in thickness was inserted between both rolls, three different loads of 100 kg/cm, 200 kg/cm and 300 kg/cm were applied between both rolls, and the widths of the nipping trace transferred onto the aluminum foil were measured. The measurement was performed with a roll surface temperature of 50° C. The obtained results are as shown in the graph of FIG. 6.

TABLE 1

|  | Inventive Example 1 | Inventive Example 2 | Comparative Example 1 | Comparative Example 2 | Comparative Example 3 |
| --- | --- | --- | --- | --- | --- |
| Thermosetting Resin | Epoxy Resin | Crosslinked Polyesteramide Resin | Crosslinked Polyesteramide Resin | Epoxy Resin | Epoxy Resin |
| Inorganic Powder | Silica Powder | Silica Powder | none | Silica Powder | Silica Powder |
| Average Particle Diameter of Inorganic Powder | 0.5 μm | 10.0 μm | — | 10.0 μm | 10.0 μm |
| Storage Elastic Modulus (dyn/cm$^2$) [at 100° C., 10 Hz] | $1.15 \times 10^{11}$ | $5.66 \times 10^{10}$ | $3.52 \times 10^{10}$ | $3.47 \times 10^{10}$ | $2.93 \times 10^{10}$ |
| Poisson's Ratio | 0.30 | 0.32 | 0.40 | 0.36 | 0.37 |
| $(1-\nu^2)/E'$ (cm$^2$/dyn) [at 100° C., 10 Hz] | $7.94 \times 10^{-12}$ | $1.59 \times 10^{-11}$ | $2.39 \times 10^{-11}$ | $2.51 \times 10^{-11}$ | $2.95 \times 10^{-11}$ |

TABLE 1-continued

|  | Inventive Example 1 | Inventive Example 2 | Comparative Example 1 | Comparative Example 2 | Comparative Example 3 |
|---|---|---|---|---|---|
| Content of Inorganic Powder at Surface Portion of Outer Layer | 73.2 wt % | 62.4 wt % | 0 wt % | 36.4 wt % | 30.0 wt % |
| Thickness of Portion Filled with Inorganic Powder | 3.0 mm | 3.0 mm | — | — | — |
| Hardness (Shore D) | 98 | 96 | 93 | 94 | 90 |
| Surface Roughness (Ra) | Ra 0.04 μm | Ra 0.15 μm | Ra 0.02 μm | Ra 0.3 μm | Ra 0.2 μm |

TABLE 2

|  |  | Inventive Example 1 | Inventive Example 2 | Comparative Example 1 | Comparative Example 2 | Comparative Example 3 |
|---|---|---|---|---|---|---|
| Thermosetting Resin |  | Epoxy Resin | Crosslinked Polyesteramide Resin | Crosslinked Polyester Resin | Epoxy Resin | Epoxy Resin |
| Poisson's Ratio (v) |  | 0.30 | 0.32 | 0.40 | 0.36 | 0.37 |
| Storage Elastic Modulus (dyn/cm$^2$) | 50° C. | $1.24 \times 10^{11}$ | $6.30 \times 10^{10}$ | $3.77 \times 10^{10}$ | $4.01 \times 10^{10}$ | $3.41 \times 10^{10}$ |
|  | 100° C. | $1.15 \times 10^{11}$ | $5.66 \times 10^{10}$ | $3.52 \times 10^{10}$ | $3.47 \times 10^{10}$ | $2.93 \times 10^{10}$ |
|  | 150° C. | $1.08 \times 10^{11}$ | $5.21 \times 10^{10}$ | $2.90 \times 10^{10}$ | $3.01 \times 10^{10}$ | $9.44 \times 10^{9}$ |
|  | 180° C. | $1.01 \times 10^{11}$ | $4.71 \times 10^{10}$ | $8.99 \times 10^{9}$ | $2.49 \times 10^{10}$ | $1.21 \times 10^{9}$ |
|  | 200° C. | $6.53 \times 10^{10}$ | $3.32 \times 10^{10}$ | $1.60 \times 10^{9}$ | $1.16 \times 10^{10}$ | $9.99 \times 10^{8}$ |
| Expression Representing Relation between Poisson's Ratio and Storage Elastic Modulus $(1 - v^2)/E'$ (cm$^2$/dyn) | 50° C. | $7.36 \times 10^{-12}$ | $1.43 \times 10^{-11}$ | $2.23 \times 10^{-11}$ | $2.17 \times 10^{-11}$ | $2.53 \times 10^{-11}$ |
|  | 100° C. | $7.94 \times 10^{-12}$ | $1.59 \times 10^{-11}$ | $2.39 \times 10^{-11}$ | $2.51 \times 10^{-11}$ | $2.95 \times 10^{-11}$ |
|  | 150° C. | $8.45 \times 10^{-12}$ | $1.73 \times 10^{-11}$ | $2.90 \times 10^{-11}$ | $2.69 \times 10^{-11}$ | $9.15 \times 10^{-11}$ |
|  | 180° C. | $9.04 \times 10^{-12}$ | $1.91 \times 10^{-11}$ | $9.34 \times 10^{-11}$ | $3.49 \times 10^{-11}$ | $7.14 \times 10^{-10}$ |
|  | 200° C. | $1.07 \times 10^{-11}$ | $2.71 \times 10^{-11}$ | $5.25 \times 10^{-10}$ | $7.50 \times 10^{-11}$ | $6.65 \times 10^{-10}$ |

Figure 4:
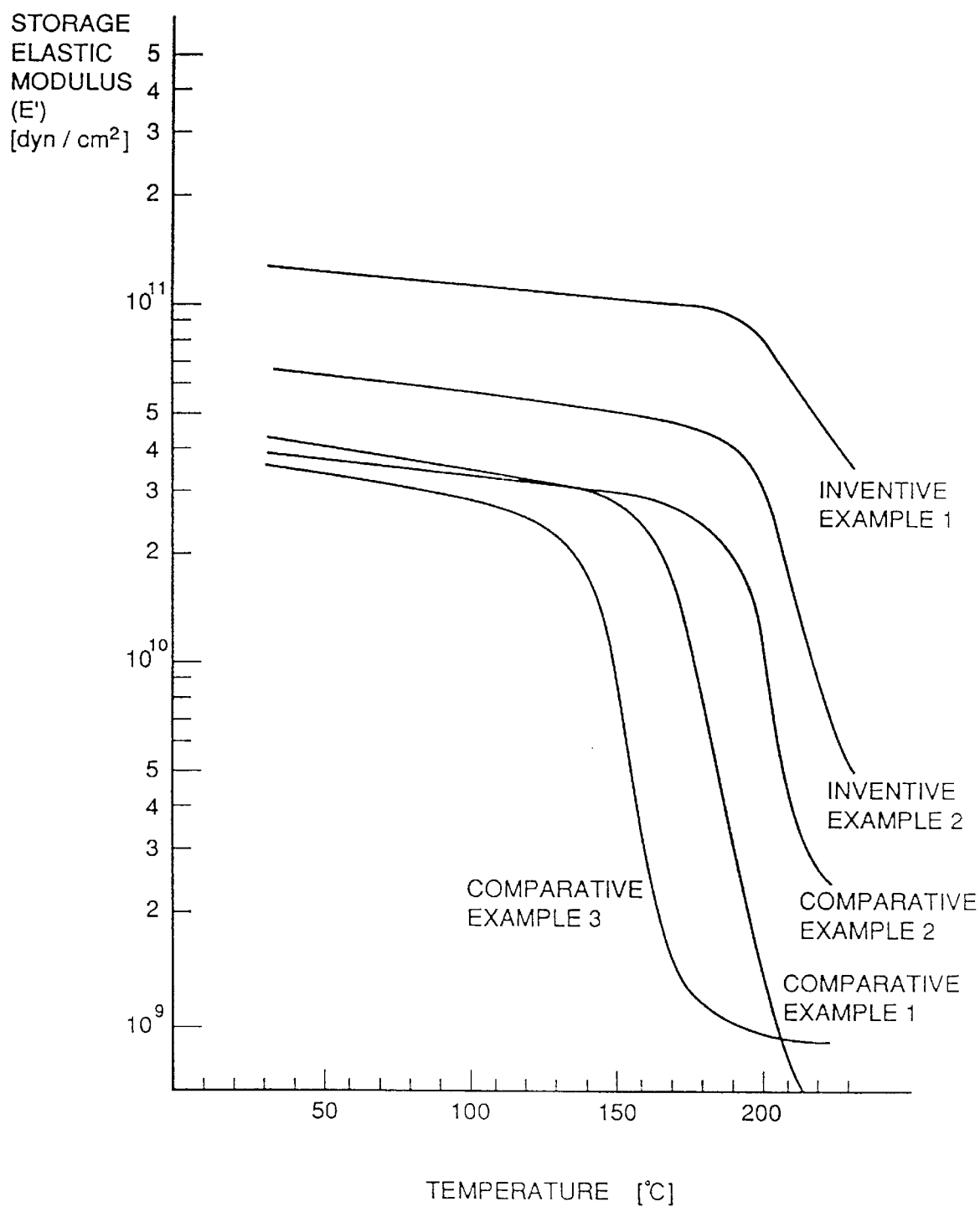
FIG. 4 is a graph showing relation between temperature of use and storage elastic modulus (E') at a surface portion of a thermosetting resin outer layer of small size test rolls in accordance with embodiments of the present invention and examples for comparison.

As is apparent from Tables 1 and 2 and from the graph of FIG. 4, the small sized resin rolls for testing corresponding to Inventive Examples 1 and 2 exhibited a high storage elastic modulus (E') as $1.24 \times 10^{11}$ to $1.08 \times 10^{11}$ dyn/cm$^2$ and $6.30 \times 10^{10}$ to $5.21 \times 10^{10}$ dyn/cm$^2$ at a temperature of 50° to 150° C., while the small sized resin rolls for testing corresponding to Comparative Examples 1 to 3 exhibited the storage elastic modulus as low as $3.77 \times 10^{10}$ to $2.90 \times 10^{10}$ dyn/cm$^2$, $4.01 \times 10^{10}$ to $3.01 \times 10^{10}$ dyn/cm$^2$ and $3.41 \times 10^{10}$ to $9.44 \times 10^{9}$ dyn/cm$^2$, respectively. Especially, the small sized resin roll for testing corresponding to Inventive Example 1 exhibited a high storage elastic modulus (E') as $1.01 \times 10^{11}$ dyn/cm$^2$ at 180° C., and as high as $8.53 \times 10^{10}$ dyn/cm$^2$ was maintained even at 200° C.

Figure 5:
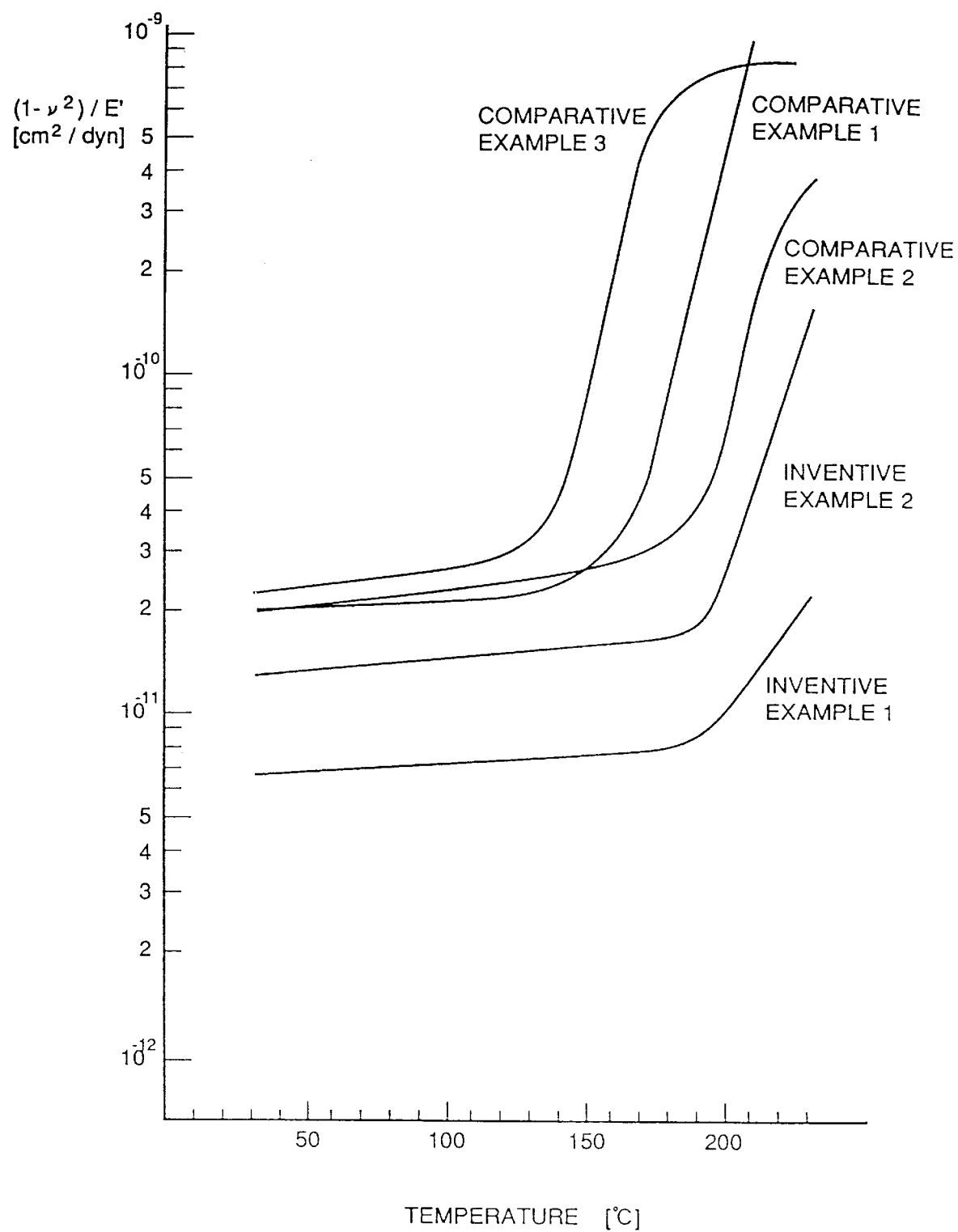
FIG. 5 is a graph showing relation between temperature of use and expression $(1-v^2)/E'$ representing relation between storage elastic modulus (E') and Poisson's ratio (v) at the surface portion of the thermosetting resin outer layer of the small size test rolls in accordance with embodiments of the present invention and examples for comparison.

As is apparent from Tables 1 and 2 and from the graph of FIG. 5, the value of the expression $(1-v^2)/E'$ representing the relation between storage elastic modulus (E') and Poisson's ratio (v) in relation to Hertz's equation representing the nip width was as low as $7.36 \times 10^{-12}$ to $8.45 \times 10^{-12}$ cm$^2$/dyn and $1.43 \times 10^{-11}$ to $1.73 \times 10^{-11}$ cm$^2$/dyn at a temperature range of 50° to 150°, respectively, for the small sized resin rolls for testing corresponding to Inventive Examples 1 and 2. The values for the small sized resin rolls for testing corresponding to the Comparative Examples 1 to 3 were as high as $2.23 \times 10^{-11}$ to $2.90 \times 10^{-11}$ cm$^2$/dyn, $2.17 \times 10^{-11}$ to $2.89 \times 10^{-11}$ cm$^2$/dyn and $2.53 \times 10^{-11}$ to $9.15 \times 10^{-11}$ cm$^2$/dyn, respectively. Furthermore, the small sized resin roll for testing corresponding to Inventive Example 2 exhibited a value as low as $1.91 \times 10^{-11}$ cm$^2$/dyn at 180° C. The small sized resin roll for testing corresponding to Inventive Example 1 exhibited a low value of $9.04 \times 10^{-12}$ cm$^2$/dyn at 180° C., and even at 200° C., it exhibited a low value of $1.07 \times 10^{-11}$ cm$^2$/dyn. Furthermore, as shown in the graph of FIG. 6, the smaller the value of the expression $(1-v^2)/E'$, the smaller the nip width.

As compared with the small sized resin rolls for testing corresponding to Comparative Examples 1 to 3, the content of silica powder at the surface portion of the resin outer layer of the small sized resin rolls for testing corresponding to Inventive Examples 1 and 2 were higher and the shore D hardness of the rolls corresponding to the Inventive Examples were also higher.

As for the surface roughness (Ra) at the surface portion of the resin outer layer of the roll, the surface roughness of the small sized resin rolls for testing corresponding to Inventive Examples 1 and 2 were smaller as compared with the small sized resin rolls for testing corresponding to Comparative Examples 2 and 3 containing silica powder. That is, the rolls corresponding to a Inventive Examples had superior surface smoothness. Especially, the small sized resin roll for testing corresponding to Inventive Example 1 used fine inorganic powder having a smaller average particle diameter, and hence the surface roughness was at the same level as that of Comparative Example 1 which was not filled with inorganic powder.

As shown in the graph of FIG. 6, when the small sized resin rolls for testing corresponding to the Inventive Examples were each brought into contact with the steel roll and subjected to a load, a smaller nip width can be obtained and accordingly, substantially larger pressure per unit area can be obtained. This is the same when the roll has the size of the machine actually in operation. Therefore, it is possible to make the surface of a magnetic recording medium smooth and to surely perform processing to increase the density of the magnetic layer or the like by passing the magnetic recording medium between the resin roll for calendering the magnetic recording medium in accordance with the present invention and a steel roll while applying a high nip pressure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A resin roll for calendering a magnetic recording medium, comprising:

a metal roll core (1); and a thermosetting resin outer layer (3); wherein a surface portion of the thermosetting resin outer layer has a storage elastic modulus (E') from $5 \times 10^{10}$ to $5 \times 10^{11}$ dyn/cm$^2$ at a temperature from 50° to 150°C. at a frequency of 10 Hz.

2. The resin roll for calendering a magnetic recording medium according to claim 1, wherein the surface portion of the thermosetting resin outer layer is uniformly filled with a high percentage content of an inorganic powder.

3. The resin for calendering a magnetic recording medium according to claim 2, wherein content of the inorganic powder at the surface portion of the thermosetting resin outer layer is from 60 to 95 percent by weight.

4. The resin roll for calendering a magnetic recording medium according to claim 2, wherein the average particle diameter of the inorganic powder is from 0.05 to 50.0 µm.

5. The resin roll for calendering a magnetic recording medium according to claim 1, wherein the hardness of the surface portion of the thermosetting resin outer layer is not lower than 95° and lower than 100° in terms of shore D harness.

6. The resin roll for calendering a magnetic recording medium according to claim 1, wherein surface roughness (Ra) at the surface portion of the thermosetting resin outer layer is not more than 0.5 µm.

7. The resin roll for calendering a magnetic recording medium according to claim 1, wherein a fiber-reinforced lower winding layer formed of a fiber material impregnated with a thermosetting resin is provided on the outer peripheral surface of the metal roll core.

8. A resin roll for calendering a magnetic recording medium comprising:

a metal roll core (1); and a thermosetting resin outer layer (3); wherein at a surface portion of the thermosetting resin outer layer, an expression $(1-v^2)/E'$ representing relation between storage elastic modulus (E') and Poisson's ratio (v) in relation to Hertz's equation representing a nip width is within a range of $$2 \times 10^{-12} \text{ cm}^2/\text{dyn} < (1-v^2)/E' < 2 \times 10^{-11} \text{ cm}^2/\text{dyn}$$

at a temperature from 50° to 150° C. at a frequency of 10 Hz.

9. The resin roll for calendering a magnetic recording medium according to claim 8, wherein the surface portion of the thermosetting resin outer layer is uniformly filled with high percentage content of an inorganic powder.

10. The resin roll for calendering a magnetic recording medium according to claim 9, wherein content of the inorganic powder at the surface portion of the thermosetting resin outer layer is from 60 to 95 percent by weight.

11. The resin roll for calendering a magnetic recording medium according to claim 9, wherein average particle diameter of the inorganic powder is from 0.05 to 50.0 µm.

12. The resin roll for calendering a magnetic recording medium according to claim 8, wherein hardness of the surface portion of the thermosetting resin outer layer is not lower than 95° and lower than 100° in terms of shore D hardness.

13. The resin roll for calendering a magnetic recording medium according to claim 8, wherein surface roughness (Ra) at the surface portion of the thermosetting resin outer layer is not more than 0.5 µm.

14. The resin roll for calendering a magnetic recording medium according to claim 8, wherein a fiber-reinforced lower winding layer formed of a fiber material impregnated with a thermosetting resin is provided on an outer peripheral surface of the metal roll core.

* * * * *